United States Patent
Hecht

(10) Patent No.: US 10,906,552 B2
(45) Date of Patent: *Feb. 2, 2021

(54) PERSONAL VEHICLE MANAGEMENT

(71) Applicant: INRIX, INC., Krikland, WA (US)

(72) Inventor: Christian Andreas Hecht, Chicago, IL (US)

(73) Assignee: INRIX, Inc., Kirkland, WA (US)

(*) Notice: Subject to any disclaimer, the term of this patent is extended or adjusted under 35 U.S.C. 154(b) by 119 days.

This patent is subject to a terminal disclaimer.

(21) Appl. No.: 15/888,494

(22) Filed: Feb. 5, 2018

(65) Prior Publication Data

US 2018/0154907 A1    Jun. 7, 2018

Related U.S. Application Data

(63) Continuation of application No. 14/824,550, filed on Aug. 12, 2015, now Pat. No. 9,884,632.

(51) Int. Cl.
*B60W 50/08* (2020.01)
*G01C 21/34* (2006.01)
(Continued)

(52) U.S. Cl.
CPC .......... *B60W 50/085* (2013.01); *B60W 40/06* (2013.01); *G01C 21/3415* (2013.01);
(Continued)

(58) Field of Classification Search
CPC .............. B60W 50/085; B60W 40/06; B60W 2050/0089; B60W 2530/14;
(Continued)

(56) References Cited

U.S. PATENT DOCUMENTS 6,219,609 B1 * 4/2001 Matsuno ............... B60T 8/1755
303/140
6,591,188 B1    7/2003 Ohler
(Continued)

FOREIGN PATENT DOCUMENTS

WO        2002/50496 A1    6/2002

OTHER PUBLICATIONS

Patent Cooperation Treaty (PCT) International Search Report and Written Opinion, issued in PCT International Patent No. PCT/US2016/046522, International Filing Date Aug. 11, 2016, dated Nov. 25, 2016 (13 pgs).

*Primary Examiner* — Rodney A Butler
(74) *Attorney, Agent, or Firm* — Cooper Legal Group, LLC

(57) ABSTRACT

Among other things, one or more techniques and/or systems are provided for personalized vehicle management. A current location of a vehicle may be received. A route of the vehicle may be determined based upon a trip library and/or the current location. The trip library may correspond to routes traveled by the user above a travel frequency threshold. A route segment (e.g., a portion of the route that the vehicle will travel within a threshold duration) may be identified. A route segment characteristic (e.g., a weather characteristic, a physical characteristic, a traffic characteristic, etc.) of the route segment may be determined. The route segment characteristic may be provided to a driver assistance component of the vehicle. The driver assistance component may be instructed to alter functionality of the vehicle using a vehicle operational parameter derived from the route segment characteristic.

20 Claims, 9 Drawing Sheets

(51) Int. Cl.
*G01C 21/36* (2006.01)
*G08G 1/09* (2006.01)
*B60W 40/06* (2012.01)
*G08G 1/0962* (2006.01)
*G08G 1/0968* (2006.01)
*B60W 50/00* (2006.01)

(52) U.S. Cl.
CPC ..... *G01C 21/3484* (2013.01); *G01C 21/3492* (2013.01); *G01C 21/3617* (2013.01); *G01C 21/3626* (2013.01); *G01C 21/3641* (2013.01); *G01C 21/3661* (2013.01); *G01C 21/3691* (2013.01); *G01C 21/3697* (2013.01); *G08G 1/09626* (2013.01); *G08G 1/096827* (2013.01); *G08G 1/096838* (2013.01); *G08G 1/096844* (2013.01); *G08G 1/096855* (2013.01); *G08G 1/096888* (2013.01); *B60W 2050/0089* (2013.01); *B60W 2530/14* (2013.01); *B60W 2552/00* (2020.02); *B60W 2554/00* (2020.02); *B60W 2555/20* (2020.02); *B60W 2710/18* (2013.01); *B60W 2710/20* (2013.01); *B60W 2710/30* (2013.01); *B60W 2720/10* (2013.01)

(58) Field of Classification Search
CPC ......... B60W 2550/12; B60W 2550/14; B60W 2550/20; B60W 2710/18; B60W 2710/20; B60W 2710/30; B60W 2720/10; G01C 21/3641; G01C 21/3661; G01C 21/3415; G01C 21/3484; G01C 21/3492; G01C 21/3617; G01C 21/3691; G01C 21/3697; G01C 21/3626; G08G 1/09626; G08G 1/096827; G08G 1/096838; G08G 1/096844; G08G 1/096855; G08G 1/096888; G08G 1/096708
See application file for complete search history.

(56) References Cited

U.S. PATENT DOCUMENTS

| | | | |
|---|---|---|---|
| 10,072,936 B2 * | 9/2018 | Nagy | G01C 21/26 |
| 2004/0158366 A1 | 8/2004 | Dieterle | |
| 2008/0097691 A1 * | 4/2008 | Seifried | G01C 21/3492 |
| | | | 701/533 |
| 2012/0142397 A1 * | 6/2012 | Jordan | G01S 5/02 |
| | | | 455/556.1 |
| 2014/0046585 A1 | 2/2014 | Morris, IV et al. | |
| 2014/0358412 A1 * | 12/2014 | Fausten | G08G 1/164 |
| | | | 701/117 |
| 2015/0228129 A1 * | 8/2015 | Cox | G01S 19/13 |
| | | | 701/29.1 |
| 2016/0280224 A1 * | 9/2016 | Tatourian | B60W 30/143 |

* cited by examiner

PERSONAL VEHICLE MANAGEMENT

CROSS-REFERENCE TO RELATED APPLICATION

This application claims priority to and is a continuation of U.S. application Ser. No. 14/824,550, filed on Aug. 12, 2015, entitled "PERSONAL VEHICLE MANAGEMENT", which is hereby incorporated by reference.

BACKGROUND

Vehicles, such as automobiles, may have numerous electronic systems that manage vehicle performance (e.g., turn assist), engine performance, passenger safety (e.g., airbag enablement), passenger comfort (e.g., temperature, audio volume, etc.), etc. Such electronic systems may have improved functional response when provided with advanced notice of upcoming road conditions. For example, if an electronic system is forewarned that a vehicle is approaching an incline, then the electronic system may improve functionality of the vehicle by initiating a downshift at an optimal time. However, vehicles may lack accurate information about upcoming road conditions. For example, an electronic system may lack information about upcoming road segments that a vehicle may travel because an actual route that the vehicle will travel may be unknown or may be a best guess (e.g., a fastest route, a most economical route, etc.) as opposed to a personalized route that a user of the vehicle may likely travel.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques are described herein for personalized vehicle management. In one aspect, a current location of a vehicle of a user may be identified. A route of the vehicle may be determined based upon a trip library corresponding to routes traveled by the user above a travel frequency threshold (e.g., the trip library may be populated with routes frequently driven by the user between locations, and the route may be identified based upon one or more locational points of the vehicle corresponding to a trip, along the route, within the trip library). A route segment of the route, which the vehicle is predicted to travel within a threshold duration, may be identified (e.g., the route may comprise a steep incline that the vehicle is predicted to encounter within 2 minutes). A route segment characteristic of the route segment may be determined (e.g., a grade of the steep incline). The route segment characteristic may be provided to a driver assistance component of the vehicle. The driver assistance component may be instructed to alter functionality of the vehicle using a vehicle operational parameter (e.g., a particular gear used for efficiently traveling up the grade of the steep incline) derived from the route segment characteristic.

One or more systems and/or techniques are further described herein for a vehicle management component of a vehicle. For example, a current location of the vehicle of a user may be presented, such as displayed through a user interface (e.g., a smart phone, a vehicle navigation component, etc.). A route segment characteristic of a route segment within a threshold distance of the current location of the vehicle may be received (e.g., a route segment of a route that the vehicle is predicted to travel). Instructions may be received for a driver assistance component of the vehicle to alter functionality of the vehicle based upon the route segment characteristic. An operational parameter of the vehicle may be used to alter a vehicle operational parameter (e.g., a braking characteristic of an automated driver component may be modified based upon a wet road condition of the route segment).

One or more systems and/or techniques are further described herein for personalized vehicle management. A current location of a vehicle of a user may be received. A route of the vehicle may be determined based upon a trip library corresponding to routes traveled by the user above a travel frequency threshold. A route segment, of the route that the vehicle will travel within a threshold duration, may be identified. A route segment characteristic of the route segment may be determined. The route segment characteristic may comprise a weather characteristic (e.g., freezing rain), a physical characteristic (e.g., an icy road condition), and/or a traffic characteristic (e.g., a large pot hole). The route segment characteristic may be provided to a driver assistance component of the vehicle. The driver assistance component may be instructed to alter functionality of the vehicle using a vehicle operational parameter derived from the route segment characteristic.

The following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
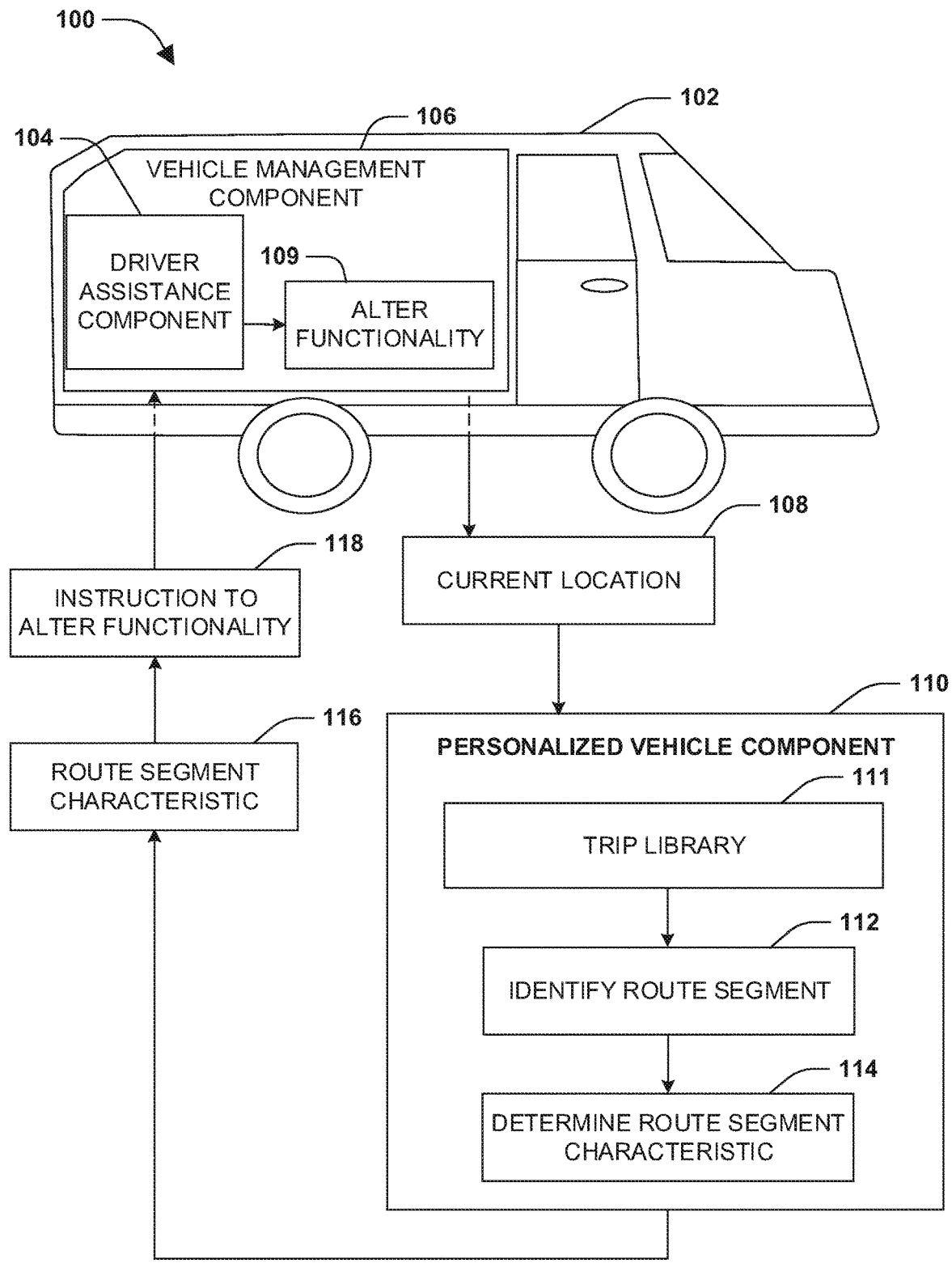
FIG. 1 is an illustration of an example system comprising a personalized vehicle component where a route segment characteristic of a route segment may be determined.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for personalized vehicle management for a user of a vehicle are provided. A trip library may be used to preemptively determine a route that the user will travel. For example, the user of the vehicle may frequently travel one or more routes, which may correspond to a user preference as opposed to least costly or quickest routes. That is, the user may prefer a particular route for various reasons, such as the route being near a location of interest (e.g., a grocery store, a home improvement store, a friend's house, a child care facility, etc.), being a relaxing drive (e.g., has foliage, is relatively flat, is relatively straight, etc.), etc. In this way, the trip library may be utilized to identify a route segment of the route that the vehicle will travel within a threshold duration (e.g., 5 minutes or some other duration). A route segment characteristic (e.g., an off-ramp, an on-ramp, a stop sign, a stop light, a bridge, a hill, hazardous conditions, weather conditions, construction, a pot hole, a toll booth, etc.) of the route segment may be identified. The route segment characteristic may be provided to a driver assistance component (e.g., a computing device of the vehicle that controls driver comfort, driver safety, vehicle efficiency, vehicle safety, etc.). The driver assistance component may alter functionality of the vehicle to address the route segment characteristic. For example, the route segment characteristic may comprise an on-ramp leading to a highway. The driver assistance component may manage engine performance and pollution control with periodic engine revving (known as 'blow-off'). Responsive to the vehicle approaching the on-ramp, the engine revving may be canceled because the blow-off may be accomplished by an acceleration of the vehicle when the vehicle merges onto the highway.

Because route segment characteristics of upcoming route segments of a route may be used for controlling the driver assistance component and the vehicle, fuel consumption by the vehicle may be decreased, driving efficiency of the vehicle may be increased, safety may be increased by altering vehicle operational parameters to address a hazard before the vehicle encounters the hazard, and/or passenger comfort may be increased by altering vehicle operational parameters to address abrupt turns, rough road conditions, etc.

FIG. 1 illustrates an example system 100 of personalized vehicle management comprising a personalized vehicle component 110 configured to instruct 118 a driver assistance component 104 to alter functionality 109 of a vehicle 102 based upon a route segment characteristic 116 of a route (e.g., a weather characteristic, a physical characteristic, a road condition, a traffic impediment characteristic, a road visibility characteristic, a road construction characteristic, a driver distraction characteristic, a traffic characteristic, etc.). The personalized vehicle component 110 may receive a current location 108 of the vehicle 102 from a vehicle management component 106. The current location 108 may be determined utilizing a global positioning system (e.g., a set of locational points provided by the vehicle 102 over time). The personalized vehicle component 110 may utilize a starting location, the current location 108, other location points of the vehicle 102 (e.g., locational points of the vehicle since an engine of the vehicle 102 as started), and/or one or more route independent conditions to identify the route of the vehicle 102 using a trip library 111. The one or more route independent conditions may comprise a time of day condition, a day of week condition, a holiday condition, a school in session condition, an event occurrence condition, a weather condition, a user mood condition (e.g., the user may indicate, such as through a social network post, that the user is excited about a lacrosse game), a user interest condition, a user social network post topic condition (e.g., the user may post a weekly lacrosse game event reminder), a user calendar entry topic condition (e.g., a calendar entry for the lacrosse game), a message topic condition (e.g., an email about the lacrosse game), etc.

The trip library 111 may be generated to comprise a set of routes previously traveled by the user. In an example, the trip library 111 may be generated to comprise a set of conditional likelihoods. A conditional likelihood may be determined as a probability that the user will travel to an ending location of the route given an occurrence of one or more route independent conditions. In an example, metadata of a first route may be stored within the trip library 111 for the ending location. The metadata may comprise coordinates of the ending location, a mean time at which the route was entered or the ending location was reached, a location of interest (e.g., a day care center), a street address of the ending location, an event hosted at or within a threshold distance of the ending location (e.g., a local event), a description of the ending location, etc. In an example, a route, within the trip library 111, may be identified as corresponding to the ending location. The user may be prompted to provide a description for the ending location (e.g., the user may specify a description or a description suggestion may be provided to the user for selection or modification). Responsive to receiving the description, the trip library 111 may be updated with the description for the ending location (e.g., home, work, lacrosse practice field, favorite ice cream shop, etc.).

A set of potential routes and/or a set of ending locations may be evaluated to identify the set of routes traveled by the user above a travel frequency threshold. For example, a potential route may be determined as the route based upon an occurrence of the route being used to travel between the starting location (e.g., home) and the ending location (e.g., work) exceeding the travel frequency threshold, which may be indicative of the user routinely and/or frequently taking the route between the starting location and the ending location (e.g., a routinely traveled route by the user from home to work on Mondays and Thursdays given sunny weather).

Based upon the route, a route segment may be identified 112. The route segment may comprise a portion of the route that the vehicle 102 may travel within a threshold duration (e.g., the vehicle 102 may be predicted to encounter the route segment within 5 minutes or less). A route segment characteristic 116 of the route may be determined 114. The route segment characteristic 116 may comprise a weather characteristic (e.g., rain, snow, ice, fog, heat, etc.), a physical characteristic (e.g., an on-ramp, an off-ramp, an incline, a decline, a curve, a straightaway, a pot hole, etc.) and/or a traffic characteristic (e.g., a slow down due to congestion, a stop sign, a stop light, an increased/decreased speed limit, etc.). The route segment characteristic 116 may be received by the vehicle management component 106 and may be provided to the driver assistance component 104 (e.g., comprising an adaptive cruise control component, an automatic light component, an engine function component, a turning assist component, a sensor component, a camera component, etc.). The instruction 118 to alter functionality 109 of the vehicle 102 using a vehicle operational parameter, derived from the route segment characteristic 116, may be provided to the driver assistance component 104. In an example, the vehicle operational parameter may comprise a vehicle speed, a vehicle speed limit parameter, a turn light on or off parameter, a speaker volume parameter, a windshield wiper parameter, a driver assist parameter, a cruise control parameter, a brake parameter, a vehicle operation parameter, etc. The vehicle may 102 may alter an operational parameter based upon the vehicle operational parameter (e.g., turn on an interior light, turn on fog lights, decrease a stereo volume, alter braking characteristics, etc.).

For example, responsive to the route segment characteristic 116 indicating a sharp turn (e.g., a turn having an angle less then 90°), the driver assistance component 104 may alter functionality 109 of the vehicle 102 to redistribute power to the tires in such a way as to better balance the vehicle 102 thought the sharp turn. In another example, responsive to the route segment characteristic 116 indicating the sharp turn, the driver assistance component 104 may alter functionality 109 of the vehicle 102 to activate a curve speed warning system to help the driver reduce a speed of the vehicle 102. In another example, responsive to the route segment characteristic 116 indicating an icy road segment, the driver assistance component 104 may alter functionality 109 of the vehicle 102 to activate an electronic stability program to counteract skidding.

Figure 2:
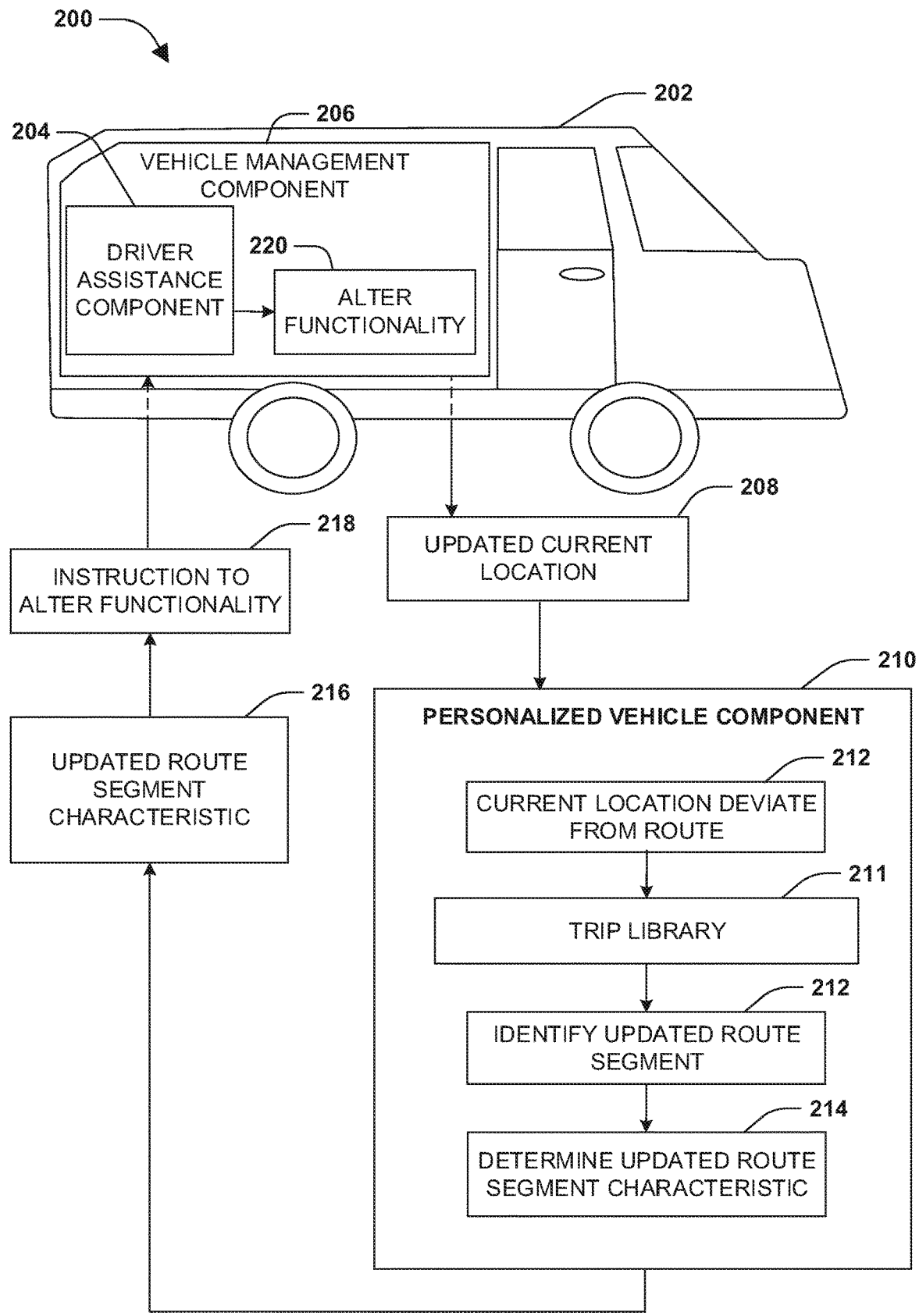
FIG. 2 is an illustration of an example system comprising a personalized vehicle component where an updated route segment characteristic of an updated route segment may be created.

FIG. 2 illustrates an example system 200 of personalized vehicle management comprising a personalized vehicle component 210 configured to instruct 218 a driver assistance component 204 to alter 220 functionality of a vehicle 202 based upon an updated route segment characteristic 216 of an updated route. The route of the vehicle 202 may have been identified based upon a trip library 211. The personalized vehicle component 210 may receive an updated current location 208 of the vehicle 202 from a vehicle management component 206. The updated current location 208 of the vehicle 202 may indicate that the vehicle 202 has deviated 212 from the route. The personalized vehicle component 210 may utilize the updated current location 208 and/or one or more route independent conditions to create an updated route of the vehicle 202 based upon the trip library 211.

Based upon the updated route, an updated route segment may be identified 212. The updated route segment may comprise a portion of the updated route that the vehicle 202 may travel within a threshold duration. The updated route segment characteristic 216 of the updated route may be determined 214. The updated route segment characteristic 216 may comprise an updated weather characteristic, an updated physical characteristic, and/or an updated traffic characteristic. The updated route segment characteristic 216 may be received by the vehicle management component 206 and may be provided to the driver assistance component 204. The instruction 218 to alter 220 functionality of the vehicle 202 using an updated vehicle operational parameter, derived from the updated route segment characteristic 216, may be provided to the driver assistance component 204.

Figure 3:
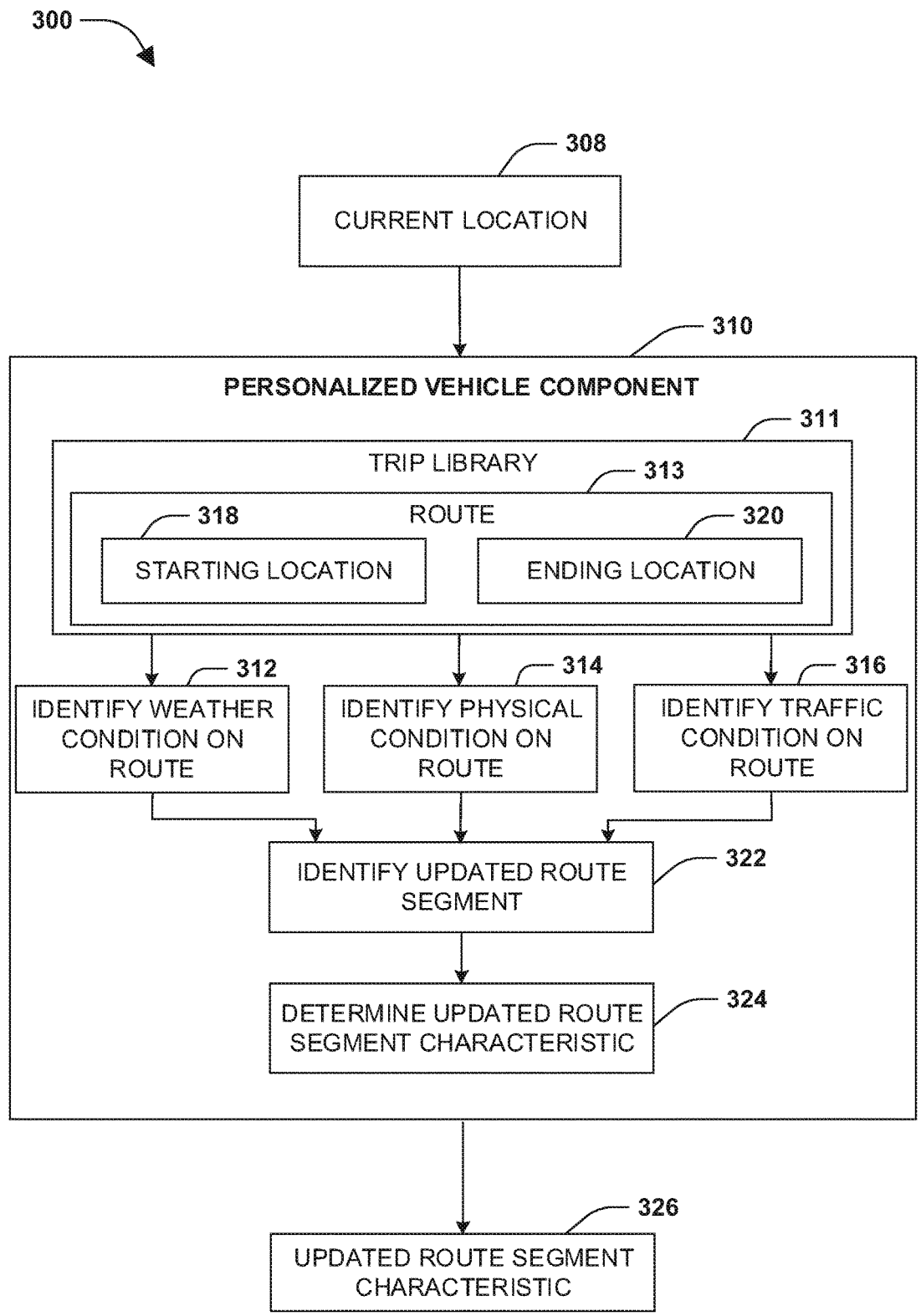
FIG. 3 is an illustration of example system comprising of a personalized vehicle component where an updated route segment may be created based upon a condition on a route.

FIG. 3 illustrates an example system 300 of personalized vehicle management comprising a personalized vehicle component 310 configured to create an updated route responsive to a weather characteristic 312, a physical characteristic 314, and/or a traffic characteristic 316 of a route 313. The personalized vehicle component 310 may identify the route 313, comprising a starting location 318 and an ending location 320. Responsive to identifying the weather characteristic 312, the physical characteristic 314, and/or the traffic characteristic 316, the personalized vehicle component 310 may, utilizing a current location 308 of a vehicle, create the updated route that avoids the weather characteristic 312, the physical characteristic 314 and/or the traffic characteristic 316 (e.g., avoid an icy bridge, avoid a street having a threshold amount of reported pot holes, avoid an intersection having a reported malfunctioning traffic light, etc.). The updated route may direct the vehicle to the ending location 320. For example, responsive to the traffic characteristic 316 comprising a traffic jam along the route 313, the updated route may direct the vehicle around the traffic jam. The personalized vehicle component 310 may identify 322 an updated route segment comprising a portion of the updated route that the vehicle may travel within a threshold duration. The personalized vehicle component 310 may determine an updated route segment characteristic 326 and provide the updated route segment characteristic 326 to the vehicle for controlling various aspects of the vehicle, such as speed, braking characteristics, automated driving characteristics, etc.

Figure 4:
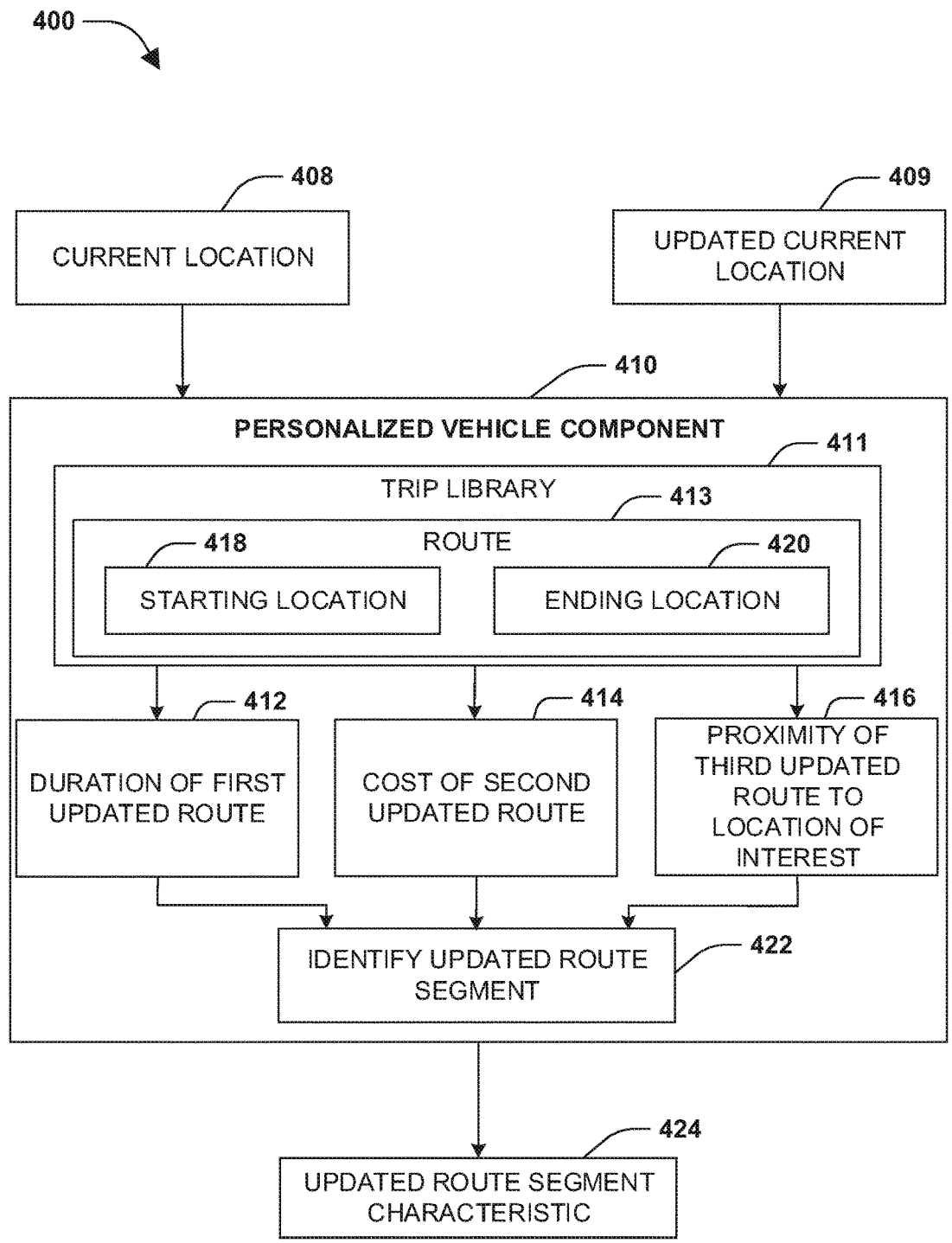
FIG. 4 is an illustration of example system comprising of a personalized vehicle component where an updated route may be created based upon one or more factors present on the updated route.

FIG. 4 illustrates an example system 400 of personalized vehicle management comprising a personalized vehicle component 410 configured to create an updated route based upon a duration of a first updated route 412, a cost of a second updated route 414, and/or a proximity of a third updated route 416 to a location of interest (e.g., a grocery store). The personalized vehicle component 410 may identify the route 413, comprising a staring location 418 and an ending location 420, using a trip library 411. Responsive to identifying a weather characteristic, a physical characteristic, a traffic characteristic, and/or a deviation from the route 413, the personalized vehicle component 410 may, utilizing a current location 408 (e.g., a prior current location of the vehicle) and/or an updated current location 409 of the vehicle, create the updated route based upon the duration of the first updated route 412, the cost of the second updated route 414, and/or the proximity of the third updated route 416 to the location of interest.

In an example, responsive to a user of the vehicle indicating a preference for a faster route, the updated route may comprise the first updated route 412, where the first updated route 412 has a shortest duration. In another example, responsive to the user of the vehicle indicating a preference for a least costly route, the updated route may comprise the second updated route 414 (e.g., where the first updated route 412 comprises more tolls than the second updated route 414). In another example, responsive to the trip library 411 indicating that the user travels to the location of interest over a travel frequency threshold, the updated route may comprise the third updated route 416 that is nearer the location of interest than the first updated route 412 and/or the second updated route 414. The updated route may direct the vehicle to the ending location 420. The personalized vehicle component 410 may identify 422 an updated route segment comprising a portion of the updated route that the vehicle is predicted to travel within a threshold duration. The personalized vehicle component 410 may determine an updated route segment characteristic 424 of the updated route segment, and may provide the updated route segment characteristic 424 to the vehicle for controlling various aspects of the vehicle, such as speed, braking characteristics, automated driving characteristics, etc.

Figure 5:
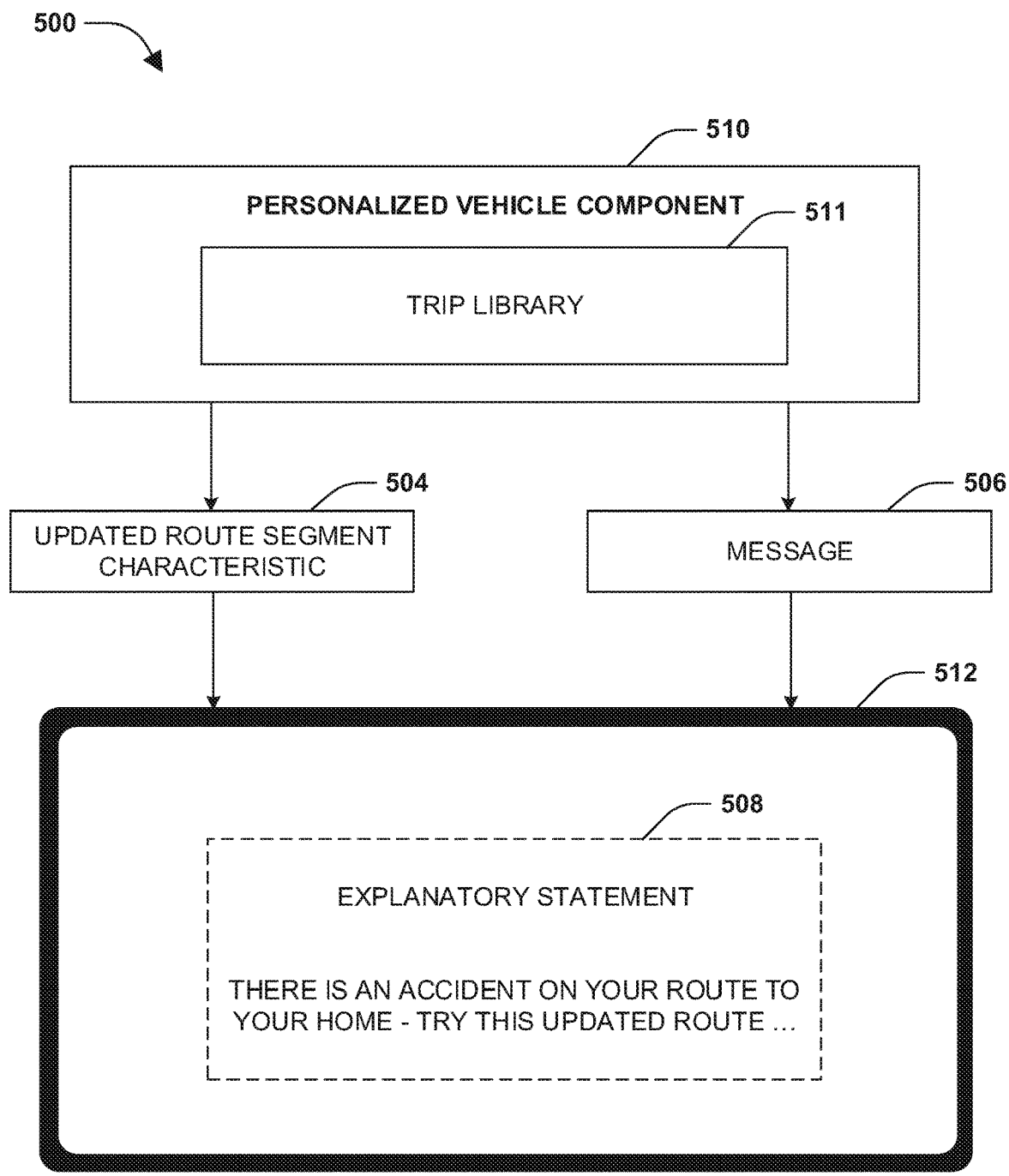
FIG. 5 is an illustration of an example system comprising a personalized vehicle component where an explanatory statement is provided to a user.

FIG. 5 illustrates an example system 500 of personalized vehicle management comprising a personalized vehicle component 510 configured to create an updated route, and provide a message 506 explaining why a user of a vehicle 512 may desire to travel the updated route rather than a current route that the vehicle may be currently traveling. The personalized vehicle component 510 may identify a weather characteristic, a physical characteristic, and/or a traffic characteristic of the route. The personalized vehicle component 510 may identify the updated route utilizing a trip library 511. The personalized vehicle component 510 may identify an updated route segment comprising a portion of the updated route that the vehicle 512 may travel within a threshold duration. The personalized vehicle component 510 may determine an updated route segment characteristic 504, and may provide the updated route segment characteristic 526 and/or the message 506 to the vehicle 512 through a user interface of the vehicle 512. The message 506 may comprise an explanatory statement 508. For example, responsive to the traffic characteristic comprising an accident along the route, the explanatory statement 508 may state "there is an accident on your route to your home, try this updated route."

Figure 6:
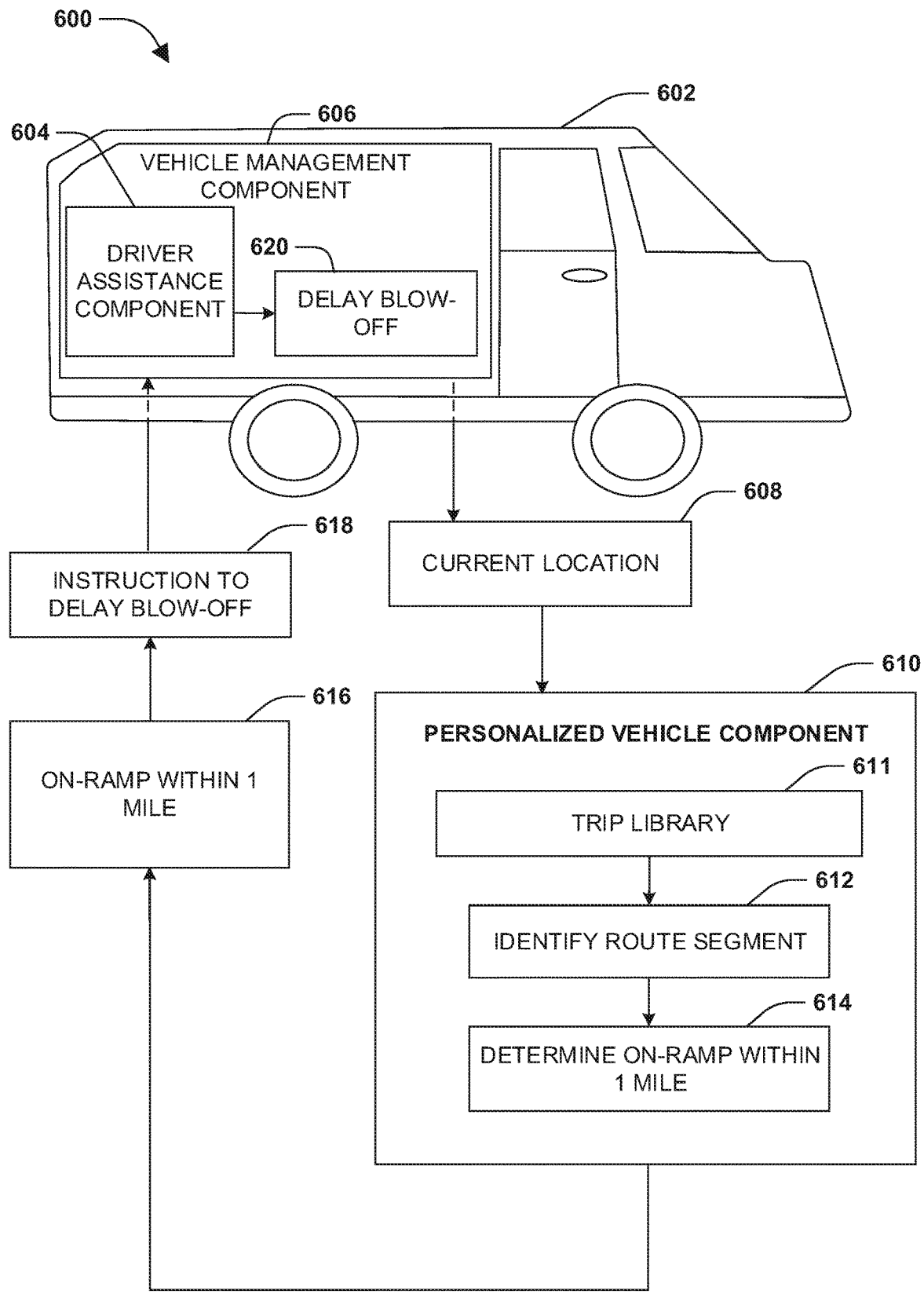
FIG. 6 is an illustration of an example system comprising a personalized vehicle component where an on-ramp is determined to be within a route segment.

FIG. 6 illustrates an example system 600 of personalized vehicle management comprising a personalized vehicle component 610 configured to instruct 618 a driver assistance component 604 to alter functionality of a vehicle 602 based upon determining 614 that an on-ramp 616 to a highway is within 1 mile of a current location 608 of the vehicle 602 travel a route. The personalized vehicle component 610 may receive the current location 608 of the vehicle 602 from a vehicle management component 606. A trip library 611 may be queried using the current location 608 and/or previous locational points of the vehicle 602 (e.g., a previous set of location points of the vehicle 602 within the past 9 minutes) to identify the route. Based upon the route, a route segment may be identified 612. The route segment may comprise a portion of the route that the vehicle 602 may travel within a threshold duration. A route segment characteristic 616 comprising the on-ramp within 1 mile of the current location 608 may be determined 614. The route segment characteristic 616 comprising the on-ramp within 1 mile may be received by the vehicle management component 606 and provided to the driver assistance component 604. The driver assistance component 604 may manage engine performance and pollution control with periodic engine revving (known as 'blow-off'). The instruction 618 to the alter functionality by delaying a blow-off 620 of an engine of the vehicle 602 may be provided to the driver assistance component 604. The driver assistance component 604 may alter engine functionality using a vehicle operational parameter derived from the route segment characteristic 616 of the instruction 618. The blow-off 620 may be delayed based upon the vehicle 602 approaching the on-ramp, because the blow-off 620 may be accomplished by an acceleration of the vehicle 620 when merging onto the highway.

Figure 7:
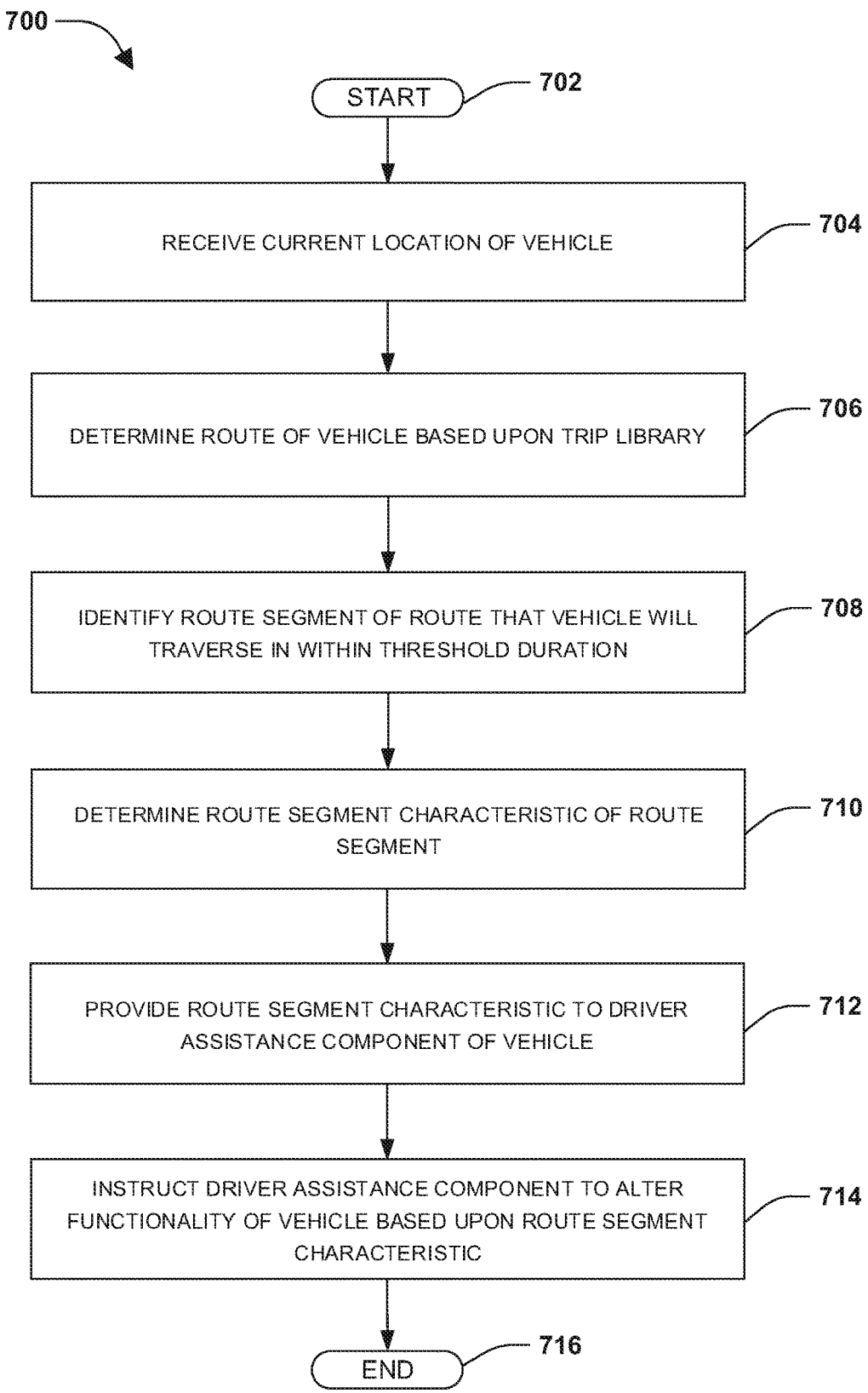
FIG. 7 is an example method for personalized vehicle management.

One embodiment of personalize vehicle management is illustrated by an exemplary method 700 in FIG. 7. At 702, the method 700 starts. At 704, a current location of a vehicle of a user may be received. At 706, a route of the vehicle may be determined based upon a trip library corresponding to routes traveled by the user above a travel frequency threshold. At 708, a route segment of the route that the vehicle will travel within a threshold duration (e.g., 5 minutes or some other duration) may be identified. At 710, a route segment characteristic of the route segment may be determined. At 712, the route segment characteristic may be provided to a driver assistance component of the vehicle. At 714, the driver assistance component may receive instructions to alter functionality of the vehicle based upon the route segment characteristics. At 716, the method 700 ends.

Figure 8:
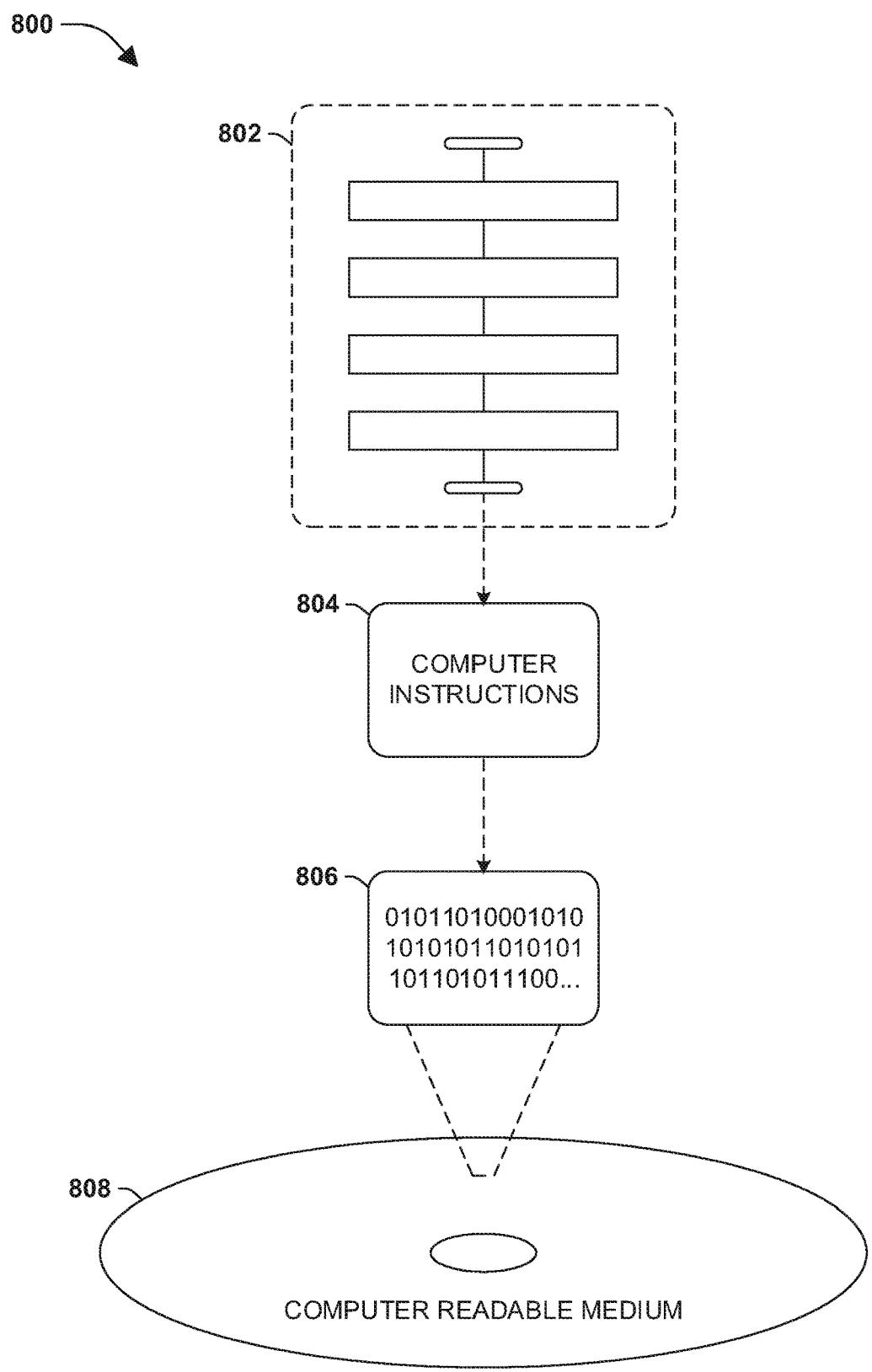
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 configured to operate according to one or more of the principles set forth herein. In one such embodiment 800, the processor-executable computer instructions 806 may be configured to perform a method 810, such as at least some of the exemplary method 700 of FIG. 7, for example. In another such embodiment, the processor-executable instructions 806 may be configured to implement a system, such as at least some of the exemplary system 100 of FIG. 1, at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 600 of FIG. 6, for example. Many such computer-readable media 802 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
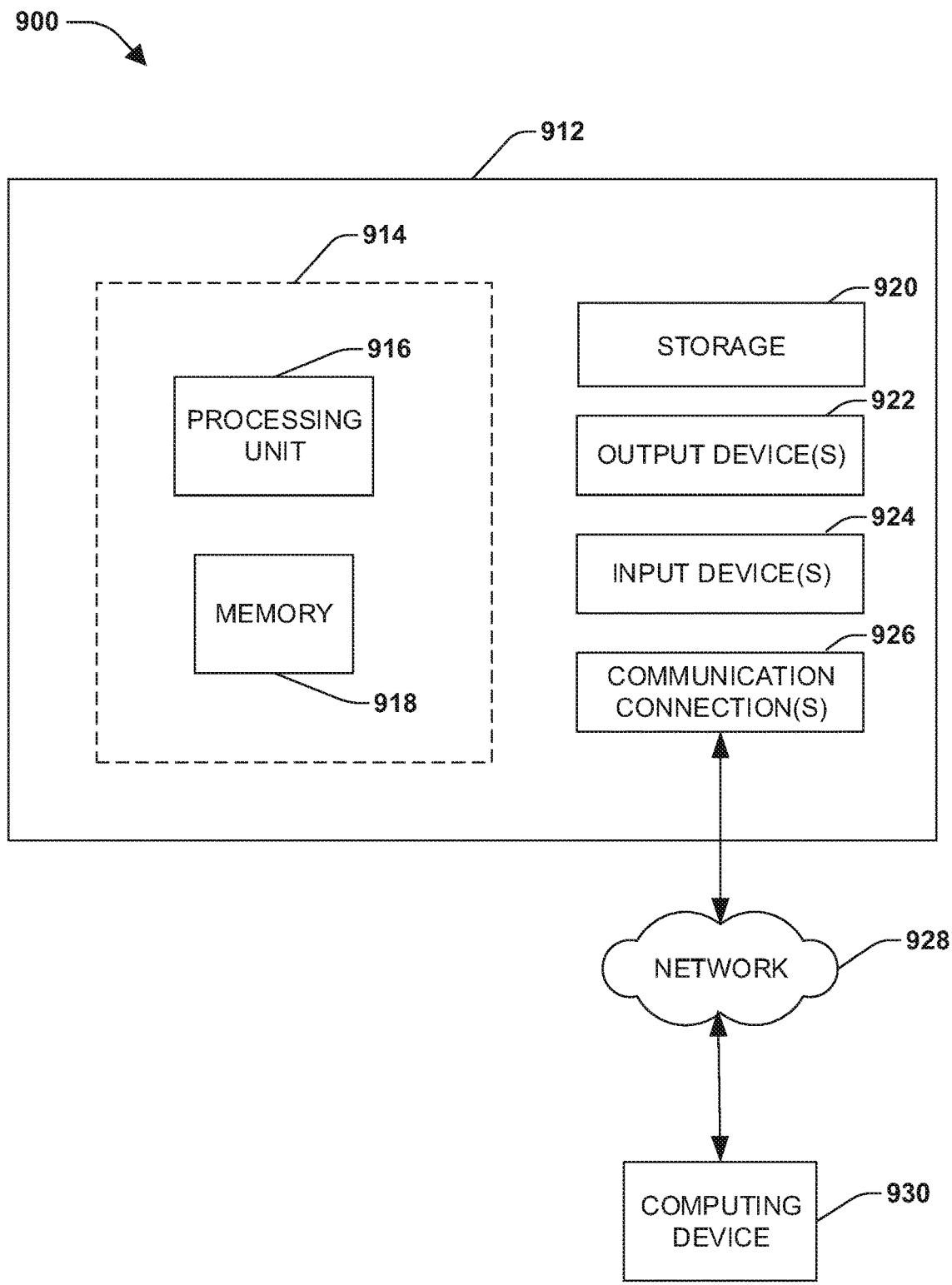
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example), or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via a network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B. It may be appreciated that, as used herein (including in the appended claims), "a", "an" and/or the like are not meant to be interpreted in a limiting manner to mean one, but instead may comprise one or more and/or the like. For example, "a modeling variable" should not be limited to a single modeling variable. Instead, "a modeling variable" may describe one or more modeling variables. Similarly, "a variable," "a model," "a correlation," "a state," or "a possible state", etc. should not be interpreted to merely describe a single variable, a single model, a single correlation, a single state, or a single possible state, etc., respectively. Instead, "a variable," "a model," "a correlation," "a state," or "a possible state", etc. may describe one or more variables, one or more models, one or more correlations, one or more states, or one or more possible states, etc., respectively, for example.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of personalized vehicle management, comprising:
receiving a current location of a vehicle of a user;
determining a route of the vehicle based upon a trip library corresponding to routes traveled by the user above a travel frequency threshold; and
creating an updated route comprising at least one of:
a first updated route between an updated current location of the vehicle and an ending location of the route responsive to a user preference for a faster route;
a second updated route between the updated current location and the ending location responsive to a user preference for a least costly route; or
a third updated route to a location of interest located between the updated current location and the ending location responsive to the trip library indicating that the user has traveled to the location of interest over a second travel frequency threshold,
wherein the first updated route has a shorter duration than the second updated route and the third updated route, the second updated route has a lower cost than the first updated route and the third updated route, and the third updated route is nearer the location of interest than the first updated route and the second updated route.

2. The method of claim 1, the creating comprising:
creating the first updated route between the updated current location of the vehicle and the ending location of the route responsive to the user preference for a faster route.

3. The method of claim 1, the creating comprising:
creating the second updated route between the updated current location and the ending location responsive to the user preference for a least costly route.

4. The method of claim 1, the creating comprising:
creating the third updated route between the updated current location and the ending location responsive to the trip library indicating that the user has traveled to the location of interest over the second travel frequency threshold.

5. The method of claim 1, comprising:
providing a message comprising an explanatory statement associated with the updated route.

6. The method of claim 1, comprising:
determining an updated route segment characteristic based upon the updated route.

7. The method of claim 6, comprising:
instructing a driver assistance device to alter functionality of the vehicle using a vehicle operational parameter derived from the updated route segment characteristic.

8. A system of personalized vehicle management, comprising:
a processor; and
memory comprising processor-executable instructions that when executed by the processor cause implementation of a personalized vehicle component configured to:
receive a current location of a vehicle of a user;
determine a route of the vehicle based upon a trip library corresponding to routes traveled by the user above a travel frequency threshold; and
create an updated route comprising at least one of:
a first updated route between an updated current location of the vehicle and an ending location of the route responsive to a user preference for a faster route;
a second updated route between the updated current location and the ending location responsive to a user preference for a least costly route; or
a third updated route to a location of interest located between the updated current location and the ending location responsive to the trip library indicating that the user has traveled to the location of interest over a second travel frequency threshold,
wherein the first updated route has a shorter duration than the second updated route and the third updated route, the second updated route has a lower cost than the first updated route and the third updated route, and the third updated route is nearer the location of interest than the first updated route and the second updated route.

9. The system of claim 8, the creating comprising:
creating the first updated route between the updated current location of the vehicle and the ending location of the route responsive to the user preference for a faster route.

10. The system of claim 8, the creating comprising:
creating the second updated route between the updated current location and the ending location responsive to the user preference for a least costly route.

11. The system of claim 8, the creating comprising:
creating the third updated route between the updated current location and the ending location responsive to the trip library indicating that the user has traveled to the location of interest over the second travel frequency threshold.

12. The system of claim 8, the personalized vehicle component configured to:
provide a message comprising an explanatory statement associated with the updated route.

13. The system of claim 8, the personalized vehicle component configured to:
determine an updated route segment characteristic based upon the updated route.

14. The system of claim 13, the personalized vehicle component configured to:
instruct a driver assistance device to alter functionality of the vehicle using a vehicle operational parameter derived from the updated route segment characteristic.

15. A non-transitory computer readable medium having stored thereon processor-executable instructions that when executed cause performance of operations, the operations comprising:
receiving a current location of a vehicle of a user;
determining a route of the vehicle based upon a trip library corresponding to routes traveled by the user above a travel frequency threshold; and
creating an updated route comprising at least one of:
a first updated route between an updated current location of the vehicle and an ending location of the route responsive to a user preference for a faster route;
a second updated route between the updated current location and the ending location responsive to a user preference for a least costly route; or
a third updated route to a location of interest located between the updated current location and the ending location responsive to the trip library indicating that the user has traveled to the location of interest over a second travel frequency threshold,
wherein the first updated route has a shorter duration than the second updated route and the third updated route, the second updated route has a lower cost than the first updated route and the third updated route, and the third updated route is nearer the location of interest than the first updated route and the second updated route.

16. The non-transitory computer readable medium of claim 15, the creating comprising:
creating the first updated route between the updated current location of the vehicle and the ending location of the route responsive to the user preference for a faster route.

17. The non-transitory computer readable medium of claim 15, the creating comprising:
creating the second updated route between the updated current location and the ending location responsive to the user preference for a least costly route.

18. The non-transitory computer readable medium of claim 15, the creating comprising:
creating the third updated route between the updated current location and the ending location responsive to the trip library indicating that the user has traveled to the location of interest over the second travel frequency threshold.

19. The non-transitory computer readable medium of claim 15, the operations comprising:
providing a message comprising an explanatory statement associated with the updated route.

20. The non-transitory computer readable medium of claim 15, the operations comprising:
determining an updated route segment characteristic based upon the updated route; and
instructing a driver assistance device to alter functionality of the vehicle using a vehicle operational parameter derived from the updated route segment characteristic.

* * * * *